US012611977B2

(12) United States Patent
Cieszkowski, III et al.

(10) Patent No.: US 12,611,977 B2
(45) Date of Patent: Apr. 28, 2026

(54) AUTOMATIC SHELVING SYSTEM FOR A VEHICLE

(71) Applicant: Osirius Group, LLC, Troy, MI (US)

(72) Inventors: Richard Matthew Cieszkowski, III, Bloomfield Hills, MI (US); Timothy David Smith, Bloomfield Hills, MI (US)

(73) Assignee: Osirius Group, LLC, Troy, MI (US)

( * ) Notice: Subject to any disclaimer, the term of this patent is extended or adjusted under 35 U.S.C. 154(b) by 630 days.

(21) Appl. No.: 17/983,283

(22) Filed: Nov. 8, 2022

(65) Prior Publication Data

US 2023/0143630 A1 May 11, 2023

Related U.S. Application Data

(60) Provisional application No. 63/276,855, filed on Nov. 8, 2021.

(51) Int. Cl.
B60P 3/00 (2006.01)
B60P 1/64 (2006.01)

(52) U.S. Cl.
CPC ............... B60P 3/007 (2013.01); B60P 1/649 (2013.01)

(58) Field of Classification Search
CPC ....... B60P 1/6436; B60P 1/6481; B60P 1/649; B60P 3/007
USPC ....................... 296/24.36; 414/340, 341, 352
See application file for complete search history.

(56) References Cited

U.S. PATENT DOCUMENTS

| | | | | |
|---|---|---|---|---|
| 4,274,789 | A * | 6/1981 | Martin | B60P 1/4421 |
| | | | | 414/501 |
| 6,398,477 | B1 * | 6/2002 | Fox | B66F 9/06 |
| | | | | 414/490 |
| 9,546,021 | B2 * | 1/2017 | Stover | B65D 19/44 |
| 9,713,977 | B1 * | 7/2017 | Neal | B60P 1/4442 |
| 10,046,689 | B2 * | 8/2018 | Wilkinson | B60P 1/38 |
| 10,624,484 | B1 * | 4/2020 | Mountford | B60P 3/03 |
| 10,934,093 | B2 * | 3/2021 | Gil | B60P 1/44 |
| 11,554,706 | B2 * | 1/2023 | Radetzki | B62B 3/005 |
| 11,560,079 | B2 * | 1/2023 | Lundeen | B60P 1/38 |
| 11,834,271 | B2 * | 12/2023 | Kalouche | B60P 3/007 |
| 11,981,508 | B2 * | 5/2024 | Chen | B60P 1/6436 |
| 11,993,194 | B2 * | 5/2024 | Kiyokami | B60P 3/007 |
| 12,017,572 | B2 * | 6/2024 | Piontek | B65D 90/008 |
| 12,026,663 | B1 * | 7/2024 | Kalm | B65G 1/137 |
| 12,103,796 | B2 * | 10/2024 | Felton | B65G 67/24 |
| 12,190,276 | B2 * | 1/2025 | Chuang | B66F 9/075 |
| 2015/0175086 | A1 * | 6/2015 | Hanley | A47B 57/10 |
| | | | | 211/126.15 |
| 2019/0143872 | A1 * | 5/2019 | Gil | B60P 1/4471 |
| | | | | 211/86.01 |

(Continued)

*Primary Examiner* — Mark C Hageman
(74) *Attorney, Agent, or Firm* — Dickinson Wright PLLC

(57) ABSTRACT

A smart shelving system for storing and unloading parcels from a vehicle. The system includes a storage rack which is located in the vehicle and includes a plurality of shelves stacked on top of one another in spaced relationship with one another. Each of the shelves has a side edge. A plurality of trays for holding the parcels are positioned on the shelves. The side edge of at least one of the shelves is aligned with at least one opening of the vehicle. At least one unloading mechanism is configured to move the trays from the shelves and through the at least one opening to a location outside of the vehicle.

14 Claims, 13 Drawing Sheets

(56)  References Cited

U.S. PATENT DOCUMENTS

| | | | | |
|---|---|---|---|---|
| 2022/0097970 A1 * | 3/2022 | Kiyokami | ............ | B60P 1/4421 |
| 2024/0086820 A1 * | 3/2024 | Garcia | ................ | B65G 1/0485 |

* cited by examiner

FIG. 1A
PRIOR ART
FIG. 1B
PRIOR ART
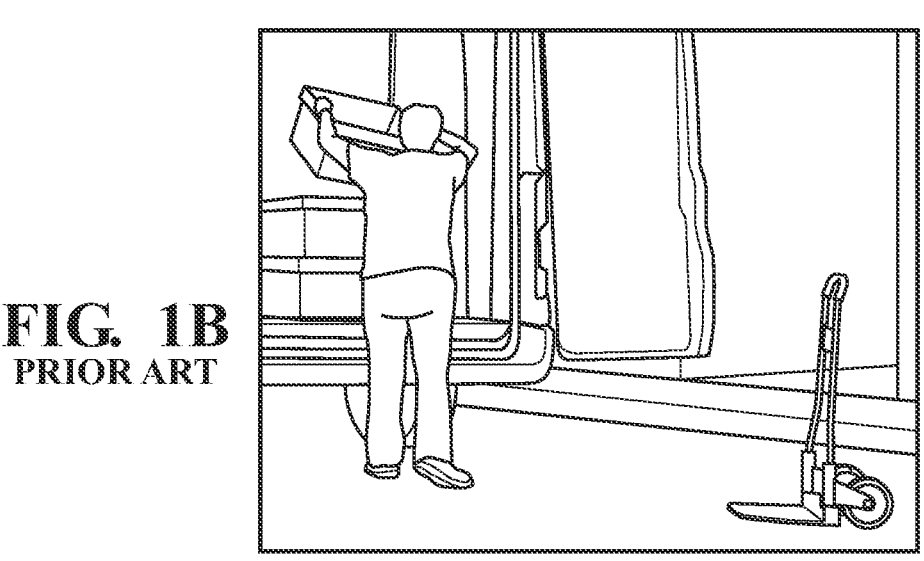
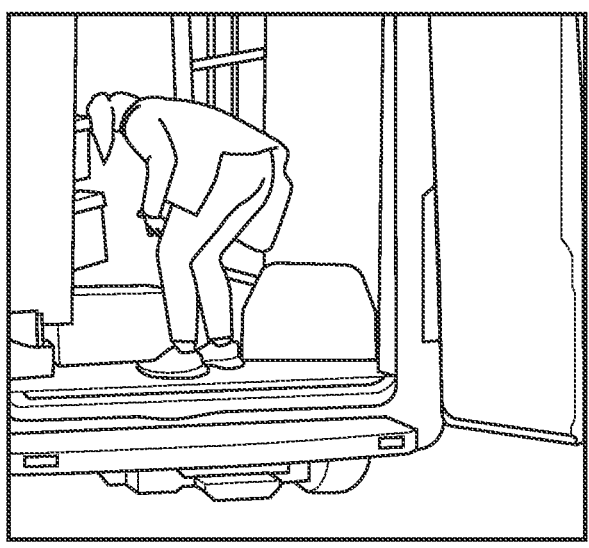
FIG. 1C
PRIOR ART

FIG. 1D
PRIOR ART
FIG. 1E
PRIOR ART
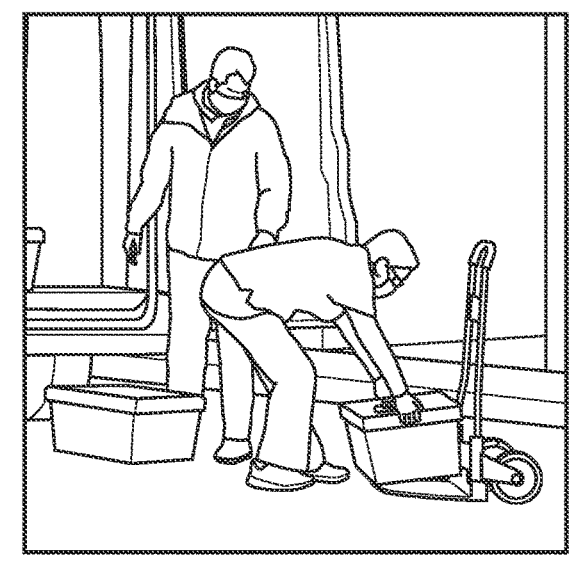
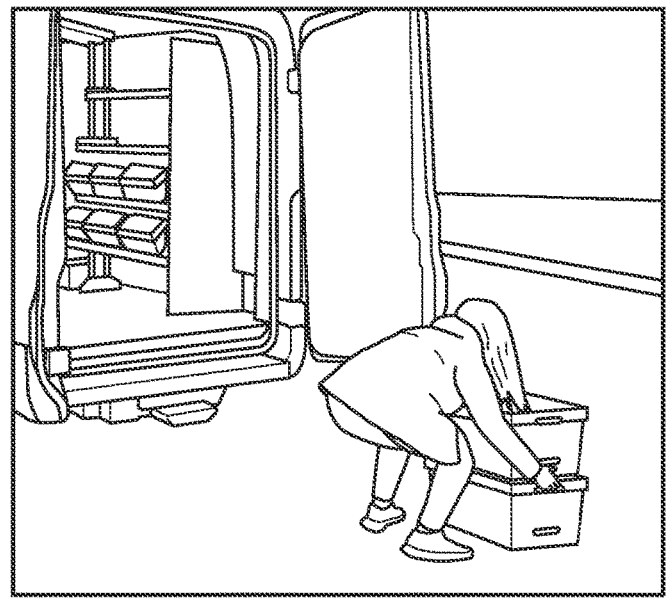
FIG. 1F
PRIOR ART

AUTOMATIC SHELVING SYSTEM FOR A VEHICLE

CROSS-REFERENCE TO RELATED APPLICATIONS

This application claims the benefit of U.S. Provisional Patent Application Ser. No. 63/276,855, filed on Nov. 8, 2021, the entire disclosure of which is hereby incorporated by reference in its entirety.

FIELD OF THE DISCLOSURE

The present disclosure relates to an automatic shelving system for a vehicle, such as a delivery vehicle. More particularly, the present disclosure relates to a smart shelving system that simplifies a process of loading and unloading parcels from storage racks in the vehicle.

BACKGROUND OF THE DISCLOSURE

This section provides background information related to the present disclosure which is not necessarily prior art.

As illustrated in FIGS. 1A-1F, delivery vehicles are known in the art for delivering parcels to recipients. Delivery vehicles typically include a passenger compartment that is located in front of a cargo area. The cargo area usually includes a series of shelves for supporting a plurality of trays that contain parcels. Upon arrival at a delivery destination associated with a specific parcel, an operator of the vehicle typically enters the cargo area, identifies which tray the parcel is located in, manually removes the tray from the vehicle and delivers the parcel to the recipient. This approach can be physically and mentally taxing on the operator as well as time consuming. Accordingly, there remains a need for improvements to shelving systems for vehicles.

SUMMARY OF THE DISCLOSURE

This section provides a general summary of the disclosure and is not intended to be interpreted as a comprehensive listing of its full scope or of all of its objects, aspects, features and/or advantages.

It is an aspect of the disclosure to provide a system which assists operators in unloading trays from a vehicle in a simple, fast and convenient manner.

It is another aspect of the disclosure to provide a system which allows an operator to easily and ergonomically move trays from the vehicle to a transportation device such as a trolley.

According to these and other aspects of the disclosure, a smart shelving system for storing and unloading parcels from a vehicle is provided. The system includes a storage rack which is located in the vehicle and includes a plurality of shelves stacked on top of one another in spaced relationship with one another. Each of the shelves has a side edge. A plurality of trays for holding the parcels are positioned on the shelves. The side edge of at least one of the shelves is aligned with at least one opening of the vehicle. At least one unloading mechanism is configured to move the trays from the shelves and through the at least one opening to a location outside of the vehicle.

According to the above and other aspects of the disclosure, another smart shelving system for storing and unloading parcels from a vehicle is provided. The smart shelving system includes a pair of storage racks for being lined up along a side of a cargo area of the vehicle. The storage racks includes a plurality of shelves stacked on top of one another. A plurality of trays for holding the parcels are positioned on the shelves. A gap is defined between the pair of storage racks. An overhead track for being connected to a ceiling of the vehicle extends along the gap between the storage racks. A transporting device is coupled with and moveable along the track for retrieving the trays from the shelves and delivering the trays to unloading locations of the vehicle.

DRAWINGS

The drawings described herein are for illustrative purposes only of selected embodiments and not all possible implementations thereof such that the drawings are not intended to limit the scope of the present disclosure.

FIGS. 1A-1F are perspective views illustrating use of conventional shelving systems of vehicles;

Corresponding reference numerals indicate corresponding parts throughout the several view of the drawings.

DETAILED DESCRIPTION OF THE EXAMPLE EMBODIMENTS

Example embodiments of a smart shelving system embodying the teachings of the present disclosure will now be described more fully with reference to the accompanying drawings. However, the example embodiments are only provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that the example embodiments may be embodied in many different forms that may be combined in various ways, and that neither should be construed to limit the scope of the disclosure. In some example embodiments, well-known processes, well-known device structures, and well-known technologies are not described in detail.

Figure 2:
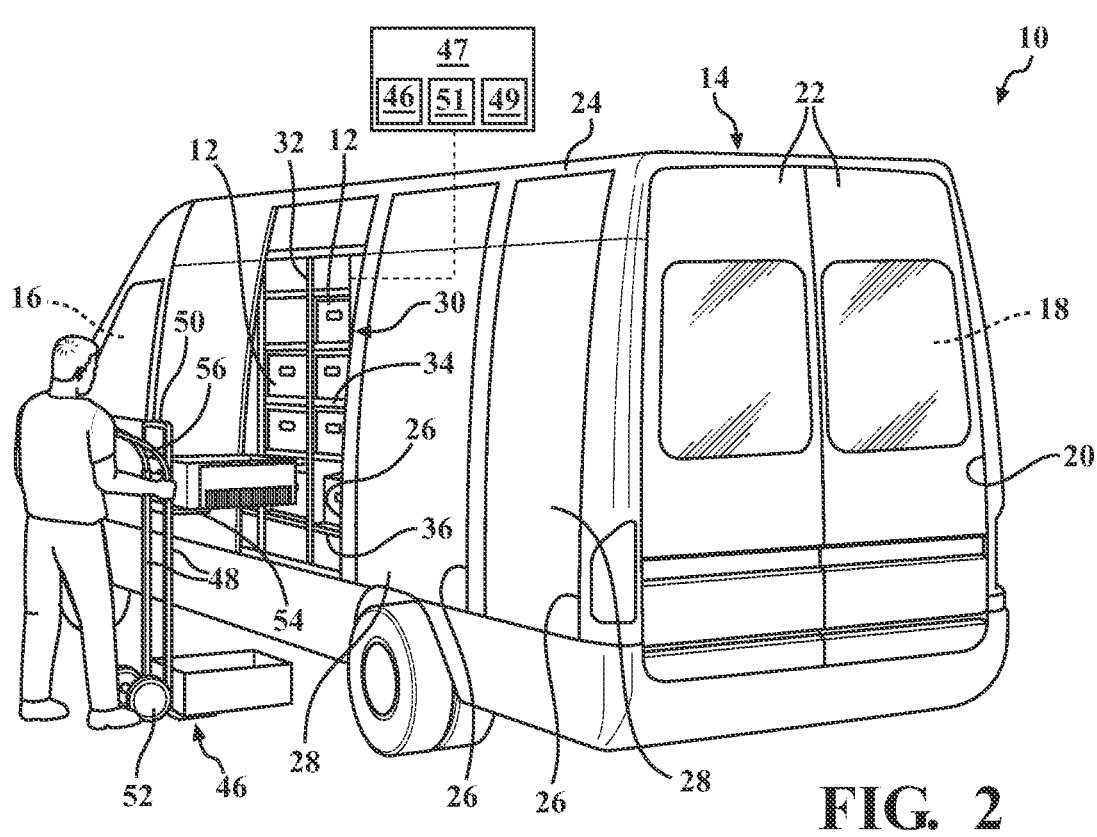
FIG. 2 is a perspective view of a vehicle including a shelving system according to an aspect of the disclosure, illustrating an operator removing a tray from the vehicle and loading the tray onto a trolley.
Figure 3:
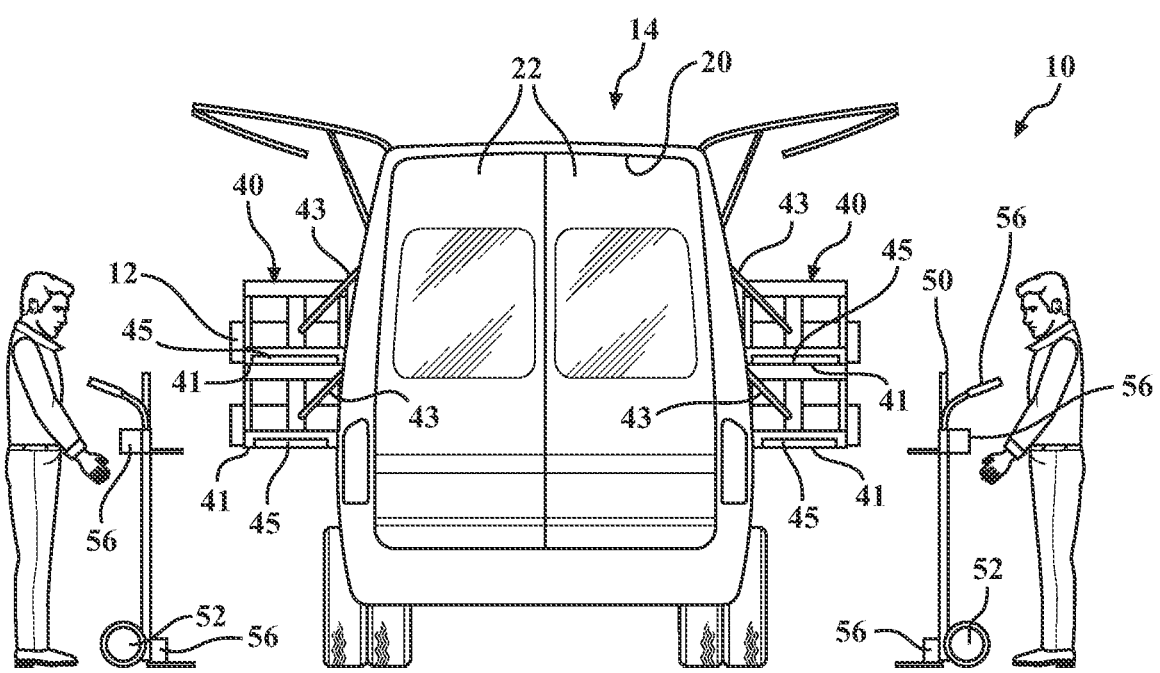
FIG. 3 is a rear view of a vehicle including the shelving system illustrating the removal of trays from the vehicle with an unloading mechanism.

As best shown in FIGS. 2-10D, a first example embodiment of a smart shelving system 10 for storing, loading and unloading a plurality of trays 12 in a vehicle 14 is generally shown. The vehicle 14 may, for example, may be a delivery vehicle 14 for delivering packages to predetermined addresses. As shown in FIG. 2, the vehicle 14 may be a van 14 including a passenger compartment 16 and a cargo area 18. Other types of vehicles may also be employed. The vehicle 14 may be manually or self-driven. In the instance in which it self-driven, it may follow a predetermined route via instructions from a control system 17 (discussed in further detail below). A rear end of the cargo area 18 may include one or more rear openings 20 and associated rear doors 22. Likewise, sidewalls 24 of the cargo area 18 may include or more side openings 26 and associated side doors 28. Moreover, an opening may be provided between the cargo area 18 and the passenger compartment 16. As such, convenient loading and unloading may be provided from openings at all sides the cargo area 18.

Figures 5, 6:
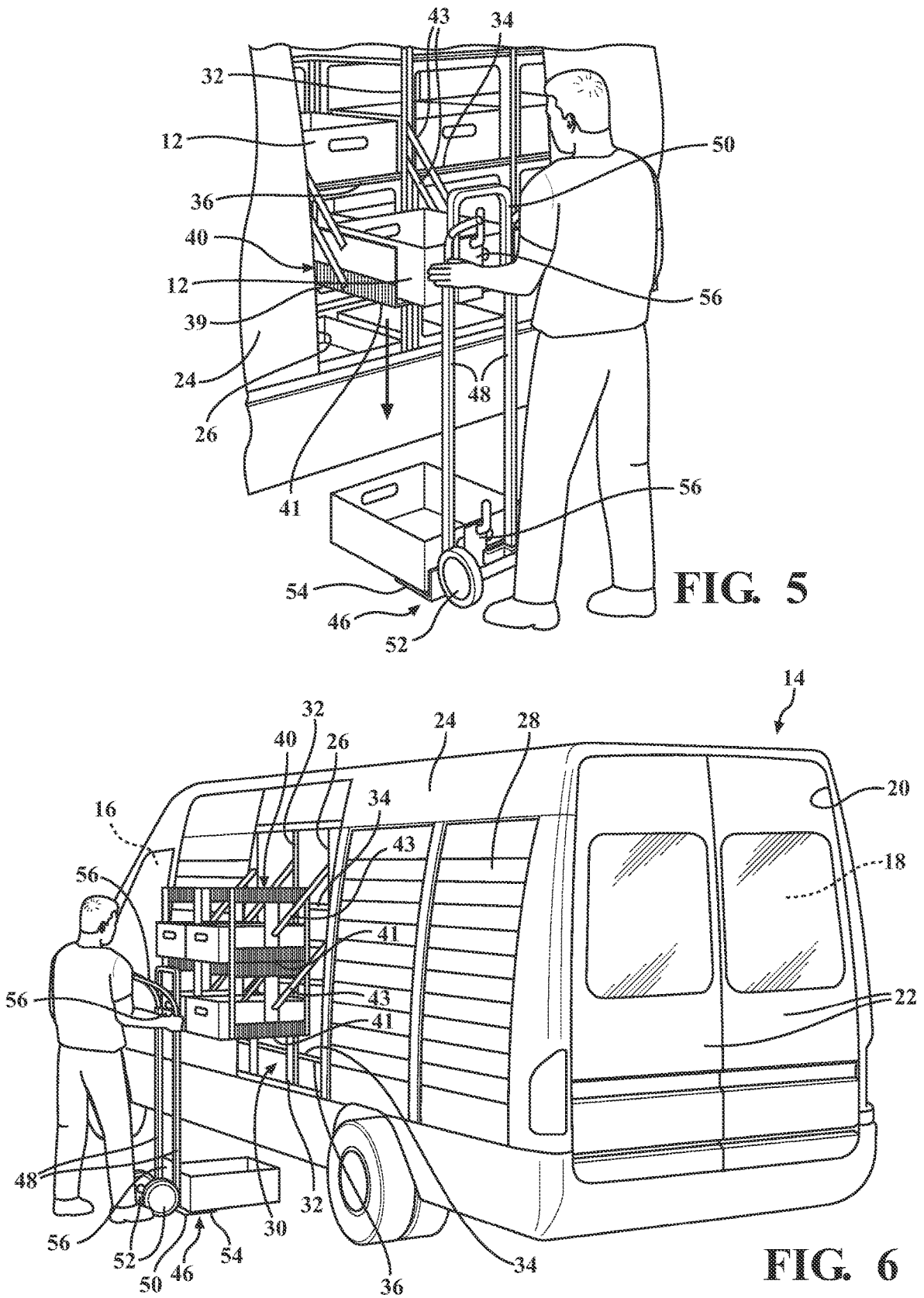
FIG. 5 is a perspective view of the shelving system illustrating the transfer of one of the trays from the unloading mechanism to a trolley.
FIG. 6 is a further perspective view of the shelving system illustrating the transfer of one of the trays from the unloading mechanism to the trolley, and further illustrating a roll-up style door on the vehicle in a rolled/open position.
Figure 7:
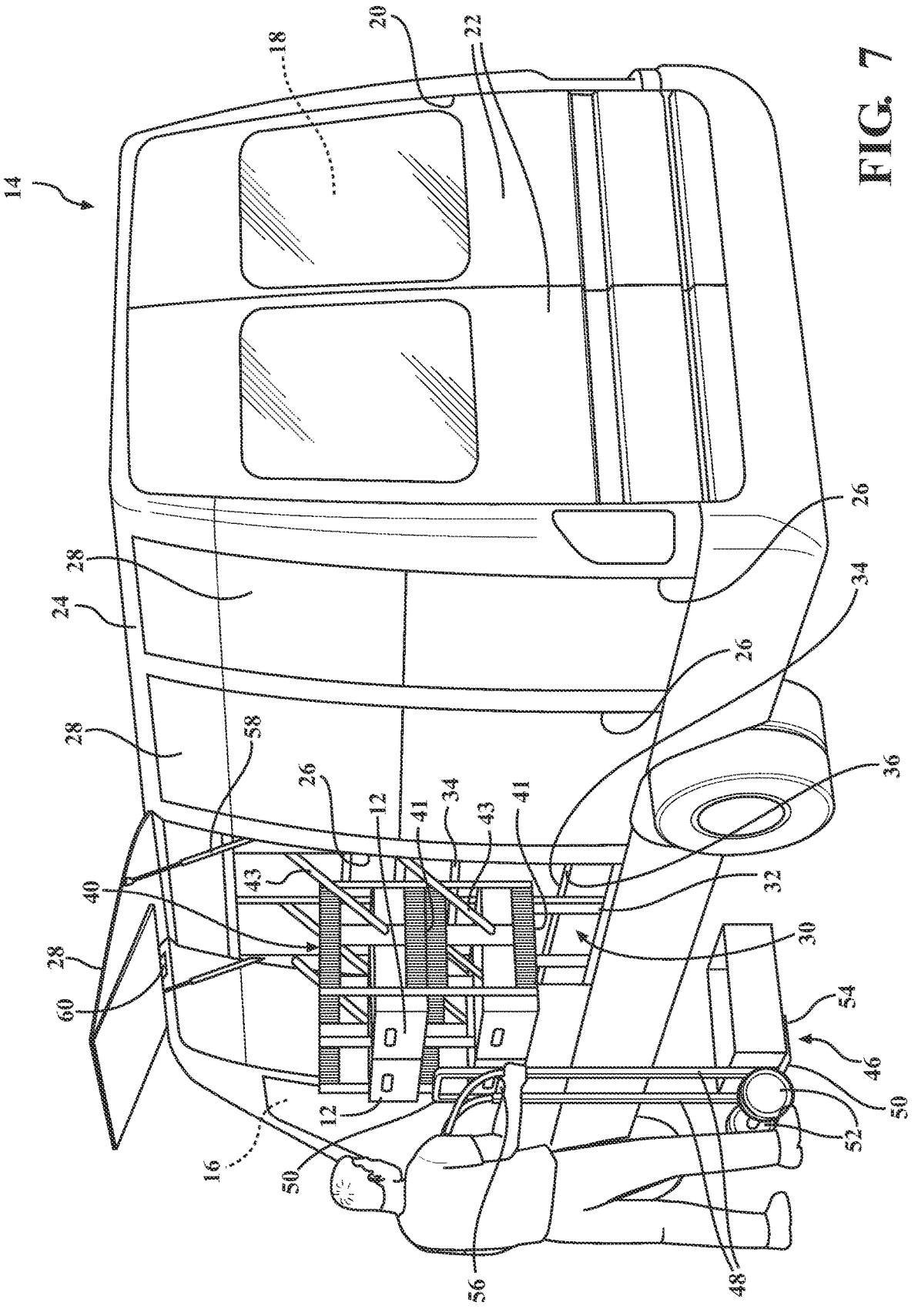
FIG. 7 is a further perspective view of the shelving system illustrating the transfer of one of the trays from the unloading mechanism to the trolley, and further illustrating a lift-up/clam shell style door on the vehicle in a pivoted/open position.

The smart shelving system 10 further includes one or more storage racks 30 that are located in the cargo area 18 of the vehicle 14. Each storage rack 30 includes a frame having a plurality of vertical end supports 32 extending in a vertical direction generally parallel to one another and defining a perimeter of the frame. Each storage rack 30 further includes a plurality of shelves 34 that are stacked on top of one another in spaced relationship with one another. As shown, the shelves 34 are sized for supporting/storing a plurality of trays 12. The trays 12 may be configured to contain items/parcels which are set for delivery to specific destinations. Each of the shelves 34 has a side edge 36 adjacent to one of the sidewalls 24 of the cargo area 18. As shown, a plurality of the side edges 36 of the shelves 34 are aligned with a side opening 26 of the cargo area 18. Any number of side openings 26 may be provided as needed to provide access to all of the trays 12, e.g., FIGS. 6 and 7 show a plurality of side openings 26 arranged adjacent to one another along a side of the vehicle.

Figure 8:
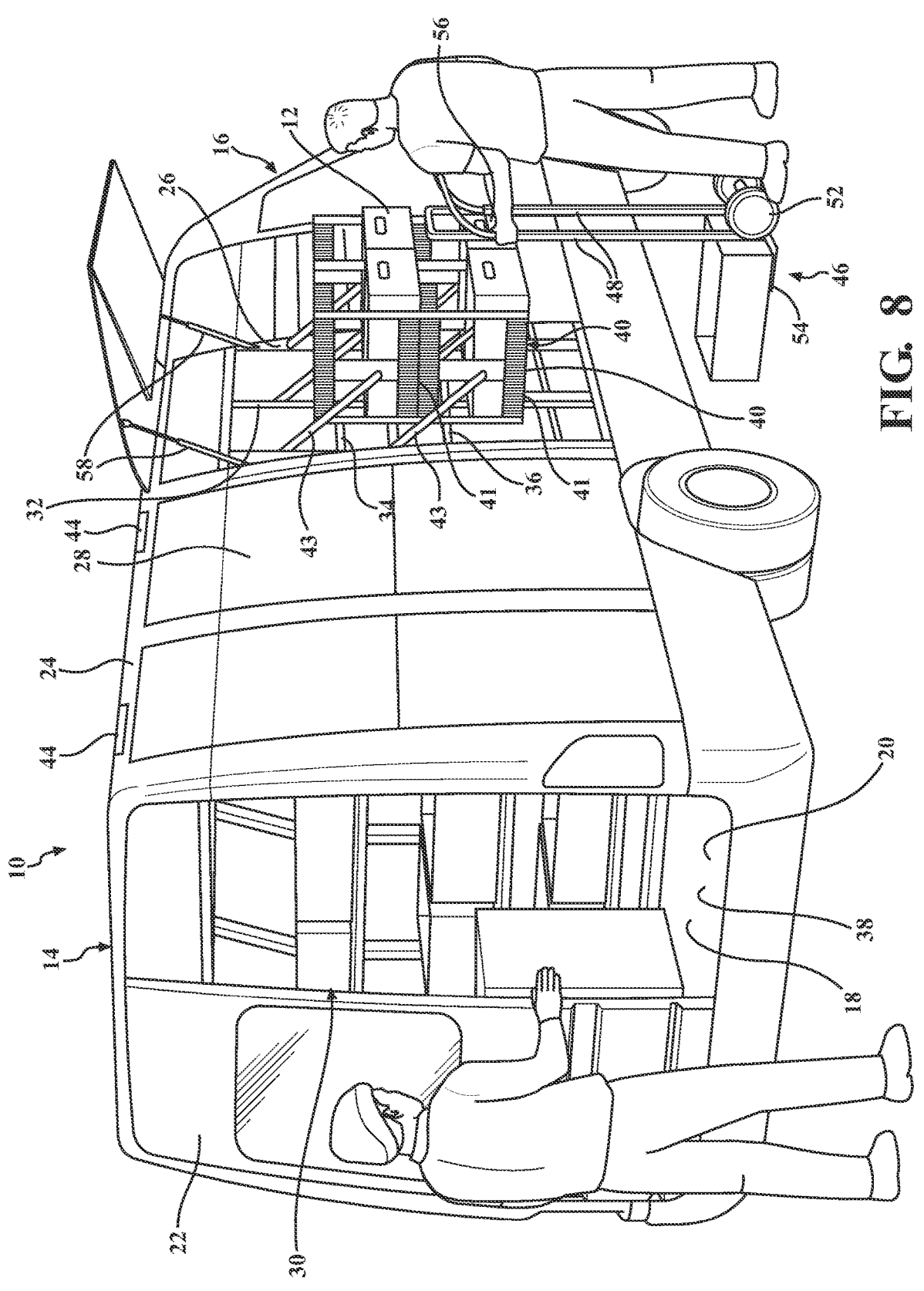
FIG. 8 is a perspective view of the vehicle including the shelving system and illustrating a rear space for additional storage.
Figure 9:
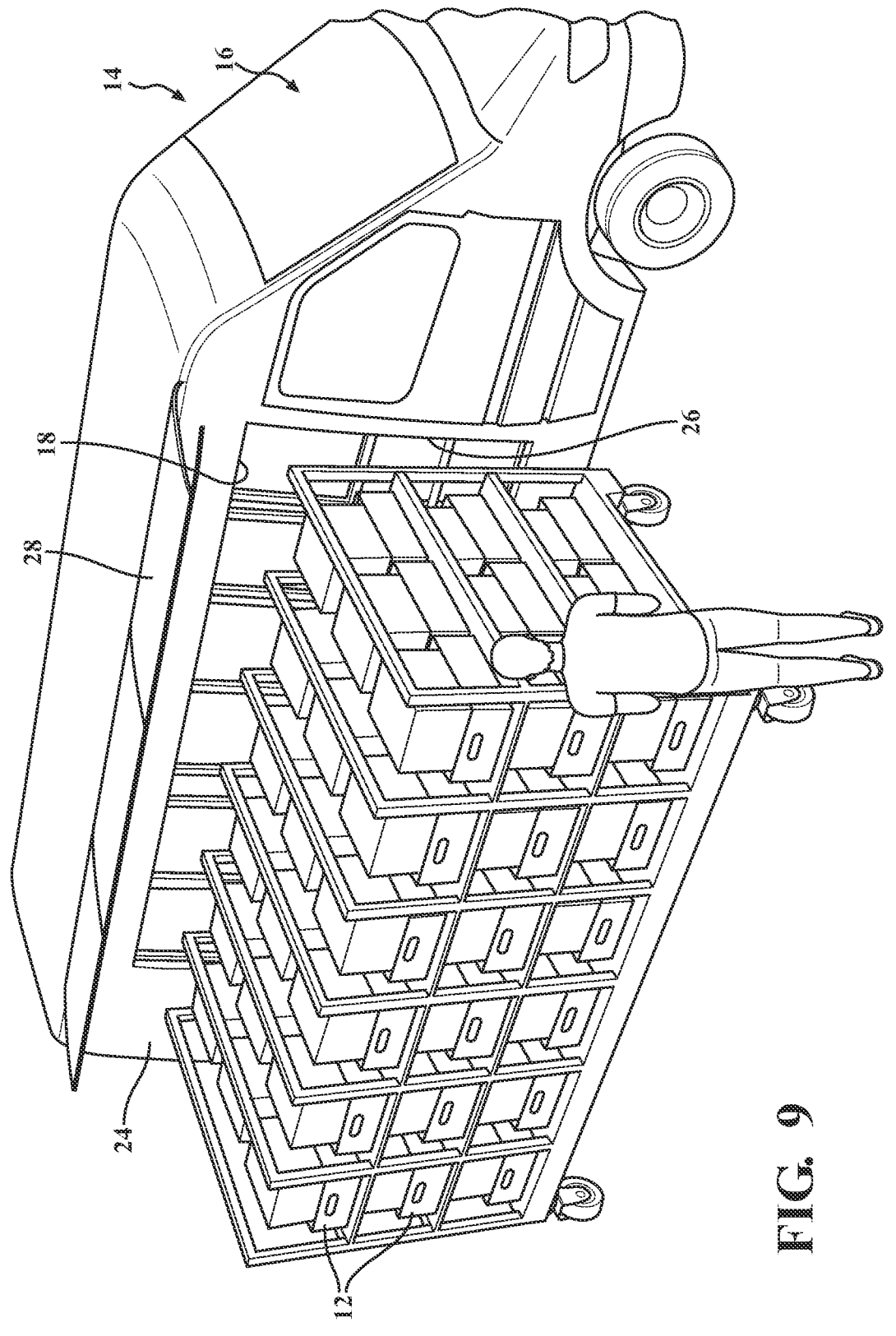
FIG. 9 is a perspective view of a vehicle including the shelving system and a cart including a plurality of the trays set to be loaded into the shelving system.

As shown in FIG. 8, an open space 38 may be provided between the storage racks 30 and the rear door 22 of the vehicle 14 which may be used as a cargo area for various items, including empty trays 12, out of sequence trays 12 and oversized parcels.

Figures 10A, 10B, 10C, 10D:
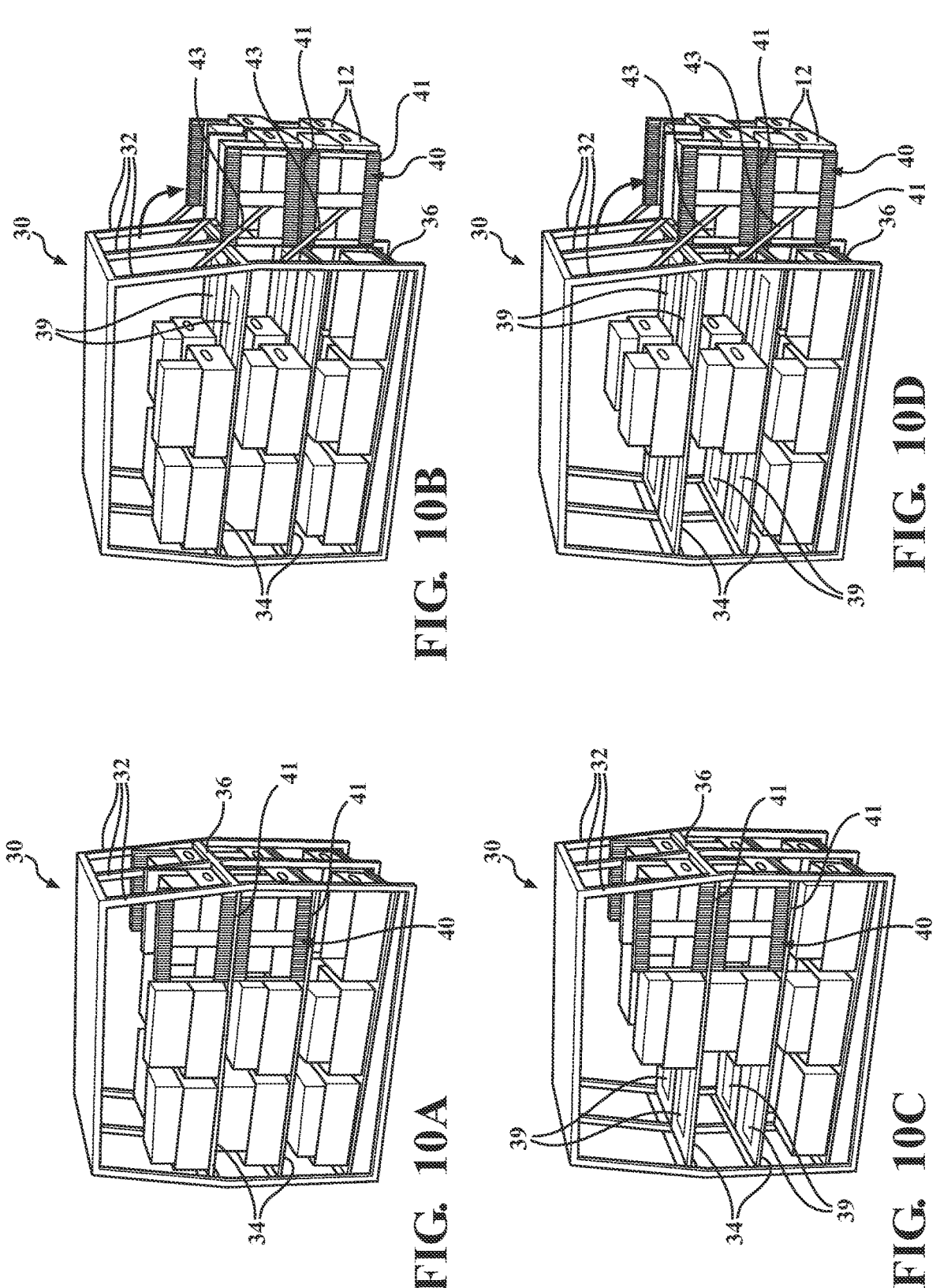
FIGS. 10A-10D illustrate a process of unloading trays with the shelving system.
Figures 11, 12:
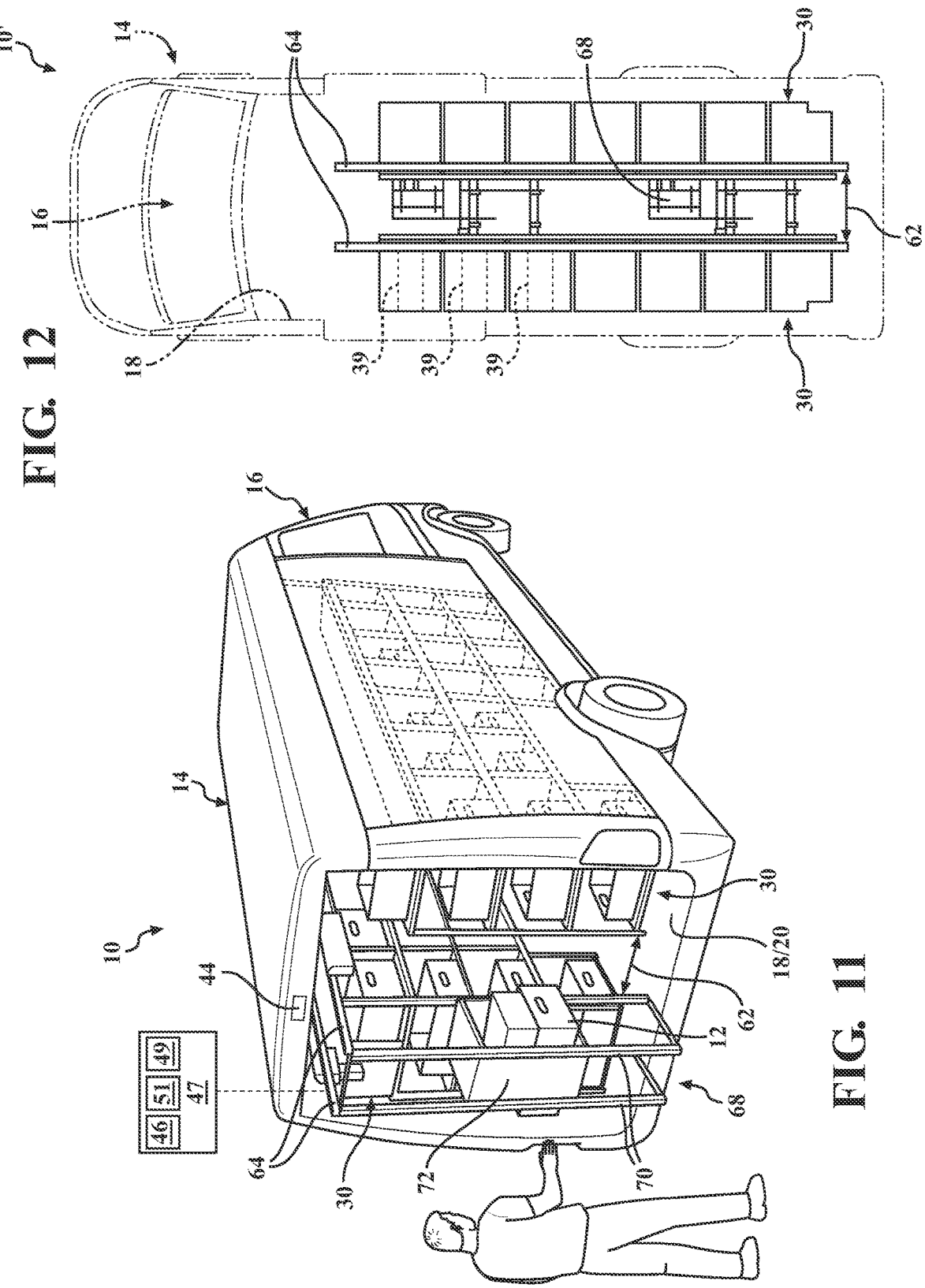
FIG. 11 is a perspective view of a vehicle with an automatic storage and retrieval shelving system.
FIG. 12 is a top, sectional view of the vehicle with the automatic storage and retrieval shelving system.
Figure 13:
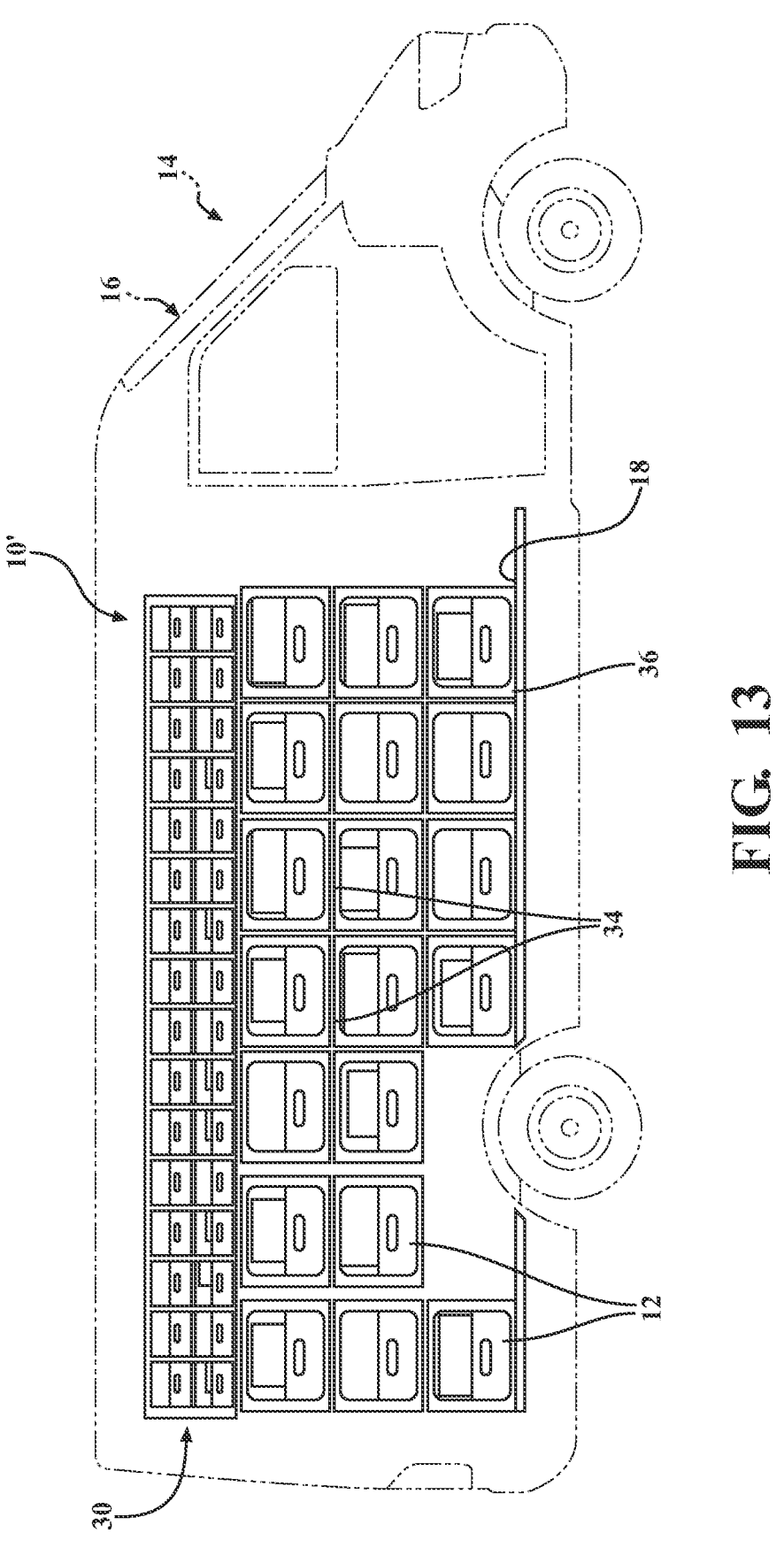
FIG. 13 is a side, partial view of the vehicle with the automatic storage and retrieval shelving system.
Figure 14:
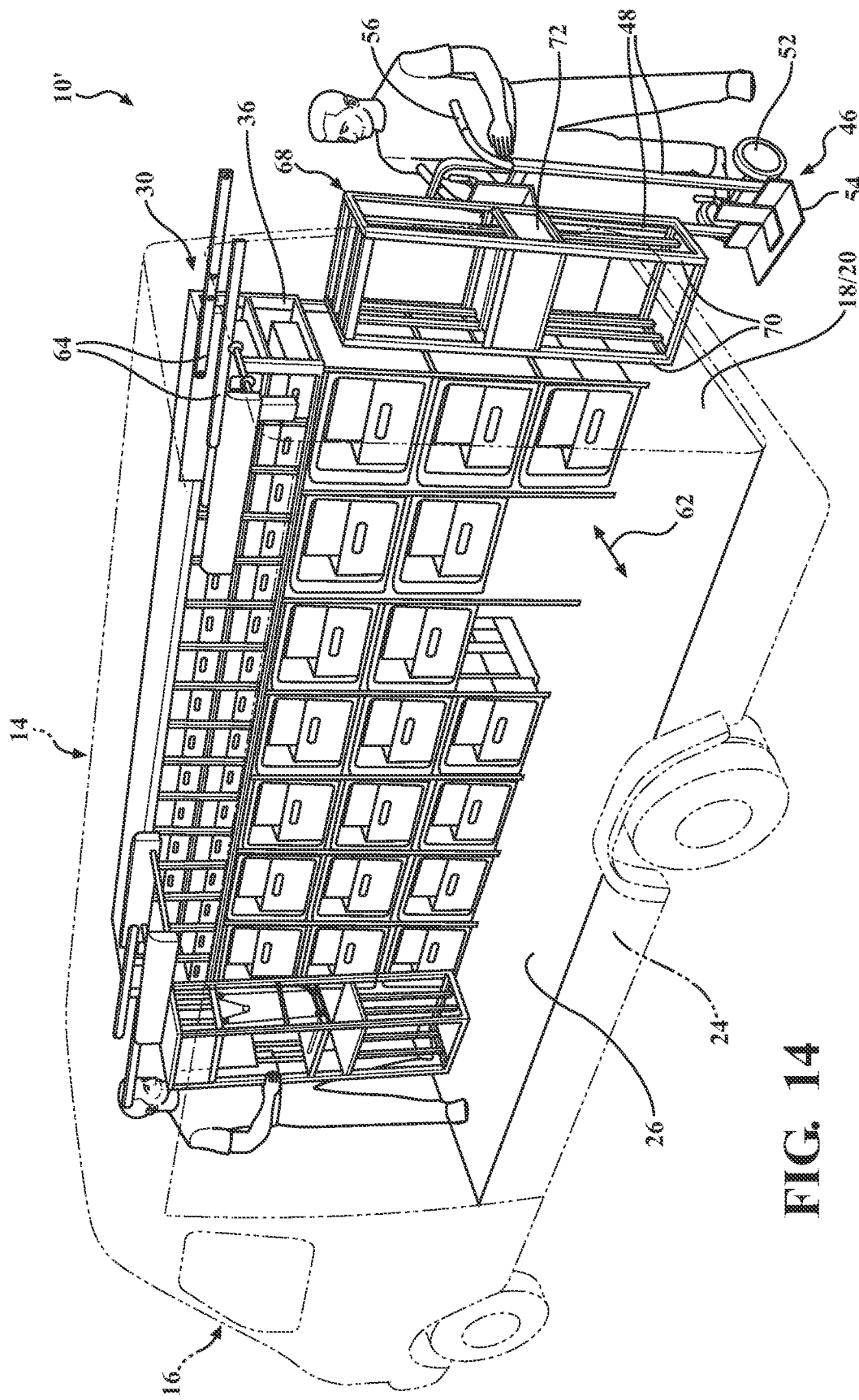
FIG. 14 is a perspective, partial view of the vehicle with the automatic storage and retrieval shelving system.

As schematically shown, for example in FIGS. 10B-10D, each of the shelves 34 may include a conveying mechanism 39 for moving the trays 12 to different locations along the shelves 34 and for receiving or sliding the trays 12 off the shelves 34. The conveying mechanism 39 may also be configured to move the trays 12 onto and off unloading mechanisms 40 (discussed in further detail below). The conveying mechanism 39 is connected to a control system

47 (schematically shown in FIG. 2) for selectively controlling the conveying mechanism 39.

As schematically illustrated in FIG. 2, the control system 47 may include a parcel database 49 that includes information about the parcels in the vehicle including, but not limited to, a tray location of the parcel, a destination of the parcel, a weight and contents. The control system 47 may also include a tracking module 51 which is configured to identify a location of the vehicle 14 at all times, such as via a global positioning system. As will be discussed in further detail below, the control system 47 may be configured to identify when trays 12 and their associated parcels should be removed based on information provided via the parcel database 49 and tracking module 51. The control system 47 may also be configured to deploy unloading mechanisms 40 to provide the trays 12 to the operator at a location that is conveniently accessible to an operator based on a detected location of the vehicle 14. For example, the control system 47 may be configured to identify the presence of the vehicle 14 at a specific delivery address, and activate the unloading mechanism 40 associated with a specific tray 12 containing a parcel that is associated with the address such that the tray 12 and parcel are easily and quickly received by the operator such that the operator may complete the delivery to a delivery location at the address. As schematically illustrated in FIG. 2, the system 10 may further include a scanning system 46 that is electrically connected to the control system 47 for allowing operators to actively scan in and out trays 12 and/or associated parcels as they are loaded and unloaded into the cargo area 18, and update the parcel database 49 based on the readings. Each of the trays 12 and parcels may have an associated scanning such as a bar code, QR code, or other equivalent device that correlates with the parcels in the tray 12 and their destinations. The control system 47 may be configured to populate the parcel database 49 and as parcels are received and removed from the vehicle 14, and configured to plan routes and determine an appropriate location for each of the trays 12 on the shelves 34 based on this data.

As best shown in FIGS. 3 and 5-7, one or more of the unloading mechanisms 40 are configured to move the trays 12 from the shelves 34 to a location outside of the vehicle 14 to assist an operator in removing the trays 12 from the vehicle 14. Each unloading mechanism 39 is connected to the control system 47 for selectively controlling the unloading mechanism 39. The unloading mechanism may be configured to move the trays 12 in any direction, e.g., vertically and horizontally, in unison or separately. Furthermore, the unloading mechanism may be automatically deployed via instructions from the control system 17 to an associated motor, or may be manually deployed.

As shown, the unloading mechanisms 40 may each have a deformable parallelogram type shape, however, other types of structures may be employed. For example, the unloading mechanisms 40 may telescopingly extend out of the vehicle 14 in a linear direction and may also be adjusted vertically in a telescoping manner. As shown in the example embodiment, the unloading mechanism 40 may include a platform 41 that is configured to support the trays 12 and one or more pivoting members 43 that are pivotably connected to the platform 41 and shelves 34 and configured to provide the movement of the unloading mechanism 40 out of the vehicle 14. More particularly, as schematically shown, like the shelves 34, the platform 41 of the unloading mechanisms 40 may each include a conveying device 45 (schematically shown in FIG. 3) for moving the trays 12 onto and off the platform 41 of the unloading mechanism 40, such as onto a trolley 46. In an alternate arrangement, there are no shelves 34, and the platforms 41 serve as shelves on their own. As shown, in addition to laterally moving the trays 12 outside of the vehicle 14, the unloading mechanism 40 may be configured to vertically move the tray 12 such that they are positioned at a height that is easy and ergonomic for an operator to handle and remove the tray 12. This vertical movement of the unloading mechanism 40 and trays 12 may occur while the unloading mechanism is located out of the vehicle 14. For example, a desired vertical movement of the unloading mechanism 40 may be established based on a height of the operator and may be selected to easily load the tray 12 onto a trolley 46 or other transporting device. The unloading mechanism 40 may be self-deployed via a motor in response to instructions from the controller 45 or may be manually moved by the operator. In any case, vertical downward movement of the unloading mechanism 40 may be assisted by gravity. The unloading mechanism 40 may be constructed to handle various weights of trays 12. The unloading mechanisms 40 may be located in alignment with one or more of the openings 20, 26 at any location of the vehicle 14, e.g., along one or more openings across an entire sidewall of the vehicle 14. Accordingly, the unloading mechanism 40 provides a smooth, simple manner of moving trays 12 in and out of the cargo area.

Figures 4, 4A:
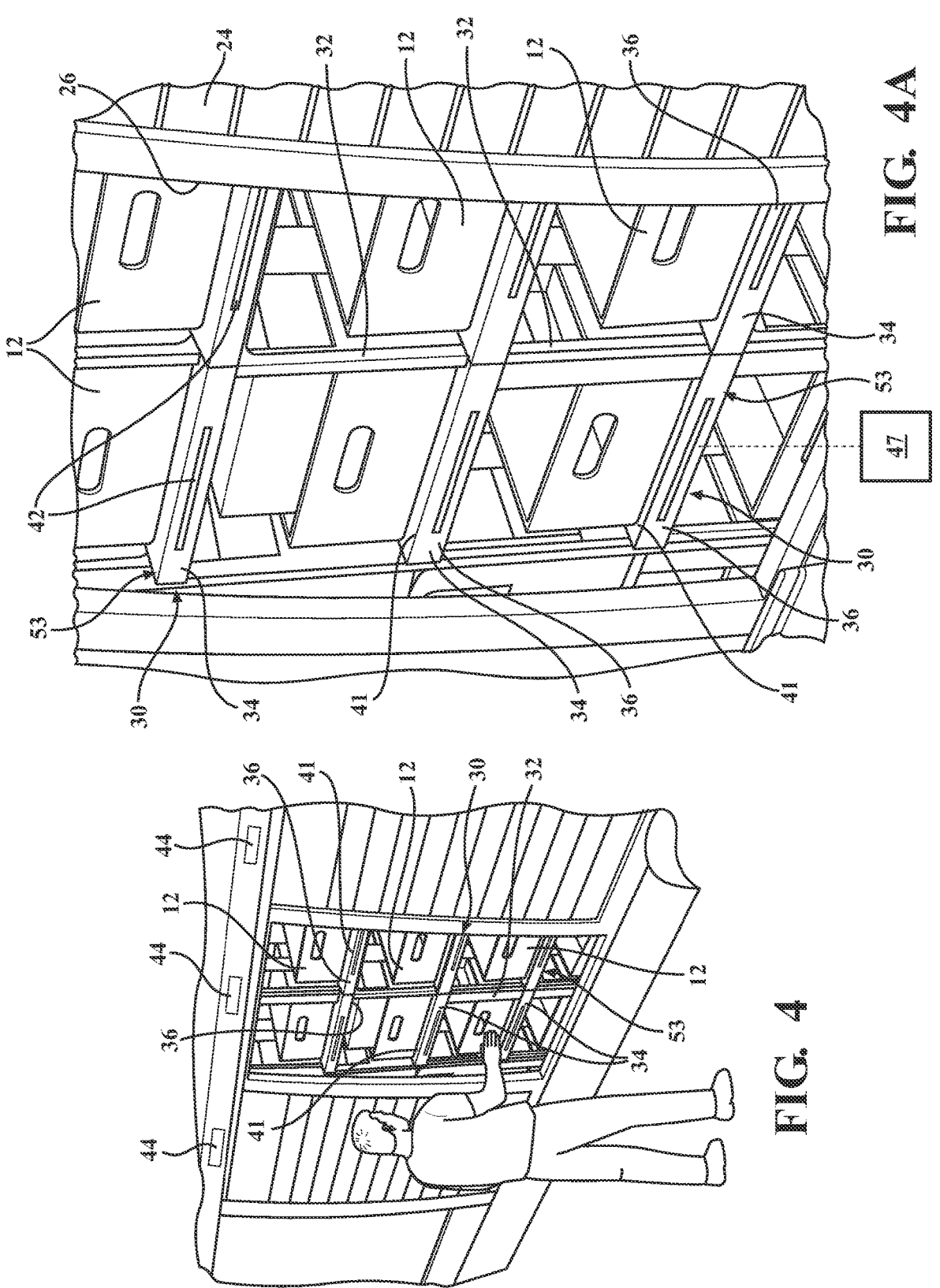
FIG. 4 is a perspective view of the shelving system illustrating a plurality of visual indicators used to indicate a status of the trays.
FIG. 4A is a perspective, magnified view of the shelving system illustrating the visual indicators.

A visual tracking system 53 is provided to assist the operator in unloading parcels at predetermined times and/or locations of the vehicle 14. The visual tracking system 53 is associated with the control system 47 for automating use of the visual tracking system 45. As best shown in FIGS. 4 and 4A, the visual tracking system 53 may include any number of visual indicators 42, such as LEDs, along the side edges 36 of the shelves 34. The visual indicators 42 may be configured to illuminate in various colors and for various reasons in response to instructions from the control system 47, thus contributing to an error proof inventory management system. For example, the control system 47 may be configured to display a green light when a tray 12 is ready for removal from the vehicle 14, e.g., upon arrival at a predetermined address based on a detected location of the vehicle 14 with the parcel database 49 and tracking module 51. The light indicators 42 may also be configured to display a red light when a tray 12 is not ready for removal. The light indicator 42 may also be configured to display various predetermined colors to indicate other pieces of information such as when a tray 12 is empty, jammed in a shelf, or when a tray 12 exceeds a predetermined weight, or it may indicate contents of the tray 12.

As best shown in FIGS. 2-3 and 5-7, a transporting device such as trolley 46 is configured to receive and support trays 12 from the unloading mechanism 40 to allow operators to conveniently move the trays 12. The trolley 46 includes a pair of vertical rails 48 that extend vertically in spaced and parallel relationship with one another. The trolley 46 further includes a pair of wheels 52 at a base of the vertical rails 48 for providing movement of the trolley 46. The trolley 46 also includes one or more horizontal supports 54 that extend transversely from the vertical rail 48 and are vertically slideable along the vertical rails 48 for receiving and supporting trays from the shelves 34. The trolley 46 further includes one or more clamping mechanisms 56 that are slideable with the horizontal supports 54 along the vertical rails 48. The clamping mechanisms 56 may be configured to couple with the trays 12 to pull the trays 12 from the unloading mechanism 40 and/or to hold the trays 12 in place on the horizontal supports 54 while the tray 12 is raised and lowered with the horizontal support 54 and while the trolley 46 is moved. The vertically lowered position of the trays 12 provided by the unloading mechanism 40 provides an ergonomic height setup for receiving the tray 12 on the trolley 46. The trolley 46 is arranged such that various numbers of trays 12 may be stacked on top of one another. According to an embodiment, the horizontal supports 54 and associated clamping mechanisms 56 may be removable from the trolley 46 to assist in stacking the trays. The clamping mechanism 56 uses visual controls to lock and unlock as needed. The visual controls may be in the form of illuminated buttons and/or an associated display screen that are configured to inform a user as to whether or not the clamping mechanism 56 is activated and to allow the user to activate/deactivate the clamping mechanism 56.

As best shown in FIGS. 6-7, at least one door 22, 28 overlies the at least one door opening 20, 26. According to a first embodiment shown in FIG. 6, the at least one door 22, 28 may be a roll-up style door 28 which is configured to roll into a compact position adjacent to a ceiling in the cargo area 18. This style of door 22, 28 advantageously may use readily available standard commercial components, presents a large surface for advertising materials, requires little space to be rolled up thus maximizing space in the cargo area, and allows simple, easy ergonomic operation for rolling and unrolling. According to a second embodiment shown in FIG. 7, the at least one door 22, 28 may include a lateral lift-up/clam shell door 28 that is pivotally connected to the vehicle 14 adjacent to a roof of the vehicle 14 and configured to pivot between a closed position in which the door 28 closes the side opening 26 and an open position in which the door 28 extends outwardly relative to the vehicle 14. A pair of struts 58 are configured to aid in opening the door 28. This style of door 28 is aesthetically appealing, as it generally has no impact on styling of the vehicle 14, it can be used as rain shelter while opened, and it may include overhead lighting 60 for assisting operators while working in the dark. It should be appreciated that any number of doors 22, 28 and associated openings 10, 26 may be provided along any region of the vehicle 14. For example, doors and openings may occupy entire sidewalls or rear ends of the vehicle to provide many unloading points. The doors 22, 28 may be electrically connected to the control system 17 to autonomously open in response to a detection that the vehicle 12 has arrived at a predetermined location. Furthermore a door indicator 44 (e.g., as shown in FIG. 8) may be located on or adjacent to each of the doors 22, 28 and may be connected to the control system 47 for indicating to a user which doors 22, 28 should be opened in order to access a tray 12 and parcel that is ready for removal based on a location of the vehicle 14.

FIGS. 10A-10D illustrate processes for loading and unloading trays 12 from the cargo area 18 of the vehicle 14. Such processes may include First In First Out (FIFO) and Last In First Out (LIFO). According to the FIFO process, trays 12 that are loaded onto the shelves 34 first are arranged such that they are the first to be removed from the vehicle 14 according to a predetermined delivery route. FIGS. 10A-10D illustrate an example of a FIFO process. As shown in FIG. 10A, the trays 12 in column 1 are loaded first, followed by columns 2 and 3. As shown in FIG. 10B, upon arrival at a first destination, the trays 12 of the top two rows of column 1 are removed with the unloading mechanism 40. As shown in FIG. 10C after unloading of the first trays 12, the trays 12 from column 2 are moved to column 1, and those from column 3 are moved to column 2. Such movements of the trays 12 may occur automatically with the conveyor devices 39, 53 in response to instructions from the control system 47. This process is repeated, as illustrated in FIG. 10D until all of the trays 12 are removed. On the other hand, according to a LIFO process, trays 12 that are loaded onto the shelves 34 last are arranged such that they are the first to be removed from the vehicle 14 according to the predetermined delivery route. According to this method, the trays 12 may be loaded and removed from either side of the vehicle 14.

As previously noted, openings 20 may be at the rear of the cargo area 18, a front of the cargo area 18 (into the passenger compartment 16) or along sidewalls 24 to make it easy for operators to unload the trays 12 at various locations. Furthermore, specific parcel/tray 12 locations may be selected based on a direction the vehicle 14 is pointing upon arrival at a destination. For example, a tray 12 may be positioned on a left-side shelf 34 in a situation in which the right side of the vehicle 14 is adjacent to a road in order to minimize a risk of operator injury from passing cars.

An automatic storage and retrieval system 10' is illustrated in FIGS. 11-14. According to this system, a pair of storage racks 30 are each lined up along a side of the cargo area 18 of the vehicle 14. Each of the storage racks 30 includes a plurality of rows and columns of shelves 34 stacked up on top of one another. As shown, the shelves 34 may be many sizes to accommodate trays 12 and associated parcels of various sizes. A gap 62 is defined between the pair of storage racks 30. As with the previously discussed shelves, the shelves 34 of the subject embodiment may include conveying elements for moving the trays 12 along the shelves 34. An overhead track 64 is connected to a ceiling of the vehicle 14 and extends along a length of the gap 62 between front and rear ends of the cargo area 18. The overhead track 64 may extend in other directions to other locations of the vehicle 14 to allow trays 12 to be moved in any direction (e.g., along at least three axes). An unloading mechanism, hereinafter referred to as a transporting mechanism 68 is slideably connected to the track 64 for moving within the cargo area 18. The transporting mechanism 68 may take various forms but in the example embodiment is comprised of a plurality of vertical tracks 70 extending in spaced and parallel relationship with one another. A horizontal carrier 72 is vertically moveable along the vertical tracks 70. The transporting mechanism 68 is configured to pull trays 12 from the shelves 34 and move them to one of a plurality of unloading locations at the openings 22, 26 in the vehicle. More particularly, the control system 47 may detect that a parcel is ready for delivery upon arrival of the vehicle at a predetermined location and move the transporting mechanism 68 into alignment with a shelf 34 upon which the parcel is located. The conveying element 39 of the shelf 34 may then be configured to move the tray 12 onto the transporting mechanism 68 and the transporting mechanism 68 may then move the tray 12 to one of the openings 22, 26 such that an operator may remove the tray 12 from the vehicle 14. The transporting mechanism 68 may also include its own conveying device to facilitate the movement of trays 12 that are positioned on the transporting mechanism 68. Furthermore, the transporting mechanism 68 may be configured to receive and expel trays in other ways. Again, the door 22, 28 associated with the opening may be automatically or manually opened upon arrival at the predetermined destination. A door indicator 44 may indicate to the operator which door 22, 28 is ready to be opened. It should be appreciated that this system permits the tray 12 to be delivered to whichever opening/door 22, 28 is most convenient to the operator. For example, it may be desirable for a tray 12 to be delivered to an opening that is opposite a road to ensure safety of the operator. The control system 47 may be configured to automatically deliver trays 12 to specific openings 22, 26, or may be manually programmed by the operator. It should be appreciated that the previously described scanning system 46 may also be employed with this arrangement.

The transporting mechanism 68 may be configured to move the trays 12 to unloading locations at the front end (into the passenger compartment 16), rear opening 20 and side openings 26 of the vehicle 14. Furthermore, as shown, the transporting mechanism 68 may be configured to extend outside of the vehicle 14 through the opening 20, 26 upon arrival of the vehicle 14 at the predetermined destination. According to this arrangement, the transporting mechanism 68 may be configured to extend outside of the vehicle 14 and/or the overhead track 64 may be configured to extend out of the vehicle 14 upon opening of the door 22, 28 to permit the transporting mechanism 68 to extend outside of the vehicle 14. Accordingly, the transporting mechanism 68 is capable of providing three-dimensional displacement of the trays 12. By providing automatic retrieval of the trays 12, the need for an operator to look for a specific tray 12 is eliminated. As shown, the vertical mobility of the horizontal carrier 72 permits the trays 12 to be delivered to an operator at a specific desired ergonomic height, e.g., onto the trolley 46. The control system 44 may further be configured to retrieve a tray 12 while the vehicle 14 is in motion to an upcoming destination such that the tray 12 is ready for receipt by the operator upon arrival at the destination.

Figure 15:
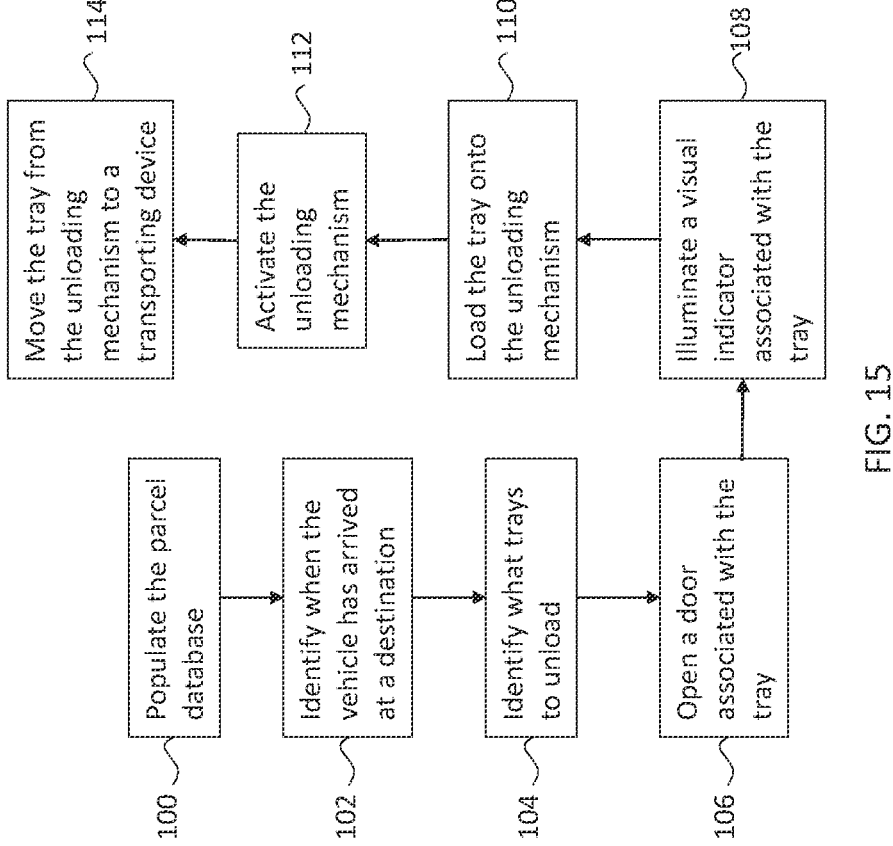
FIG. 15 is a flow diagram of an example method of using the subject shelving system.

With reference to FIG. 15, a method for using the subject smart shelving system 10 is provided. As shown, the method may include the step of 100 populating the parcel database 49 as parcels are loaded into the trays 12. As previously noted, the parcel database 49 may include various types of information associated with the parcels/trays 12 including, but not limited to, a destination of the parcels, weights, contents and tray 12 location on the shelves 34. The method may also include 102 identifying when the vehicle 14 has arrived at a predetermined location with the control system 17. It should be appreciated that prior to this step, the vehicle 14 may automatically drive to the destination based on instructions from the control system 17 based on the parcel database 49 and/or an operator may be instructed on how to navigate to the destination. The method may also include 104 identifying which trays 12 include parcels that should be delivered to the destination. The method may also include 106 activating a door indicator 44 to inform the operator of which door to stand near to receive the parcel. Alternatively the system 10 may be configured to allow the operator to select a door, and to deliver the tray 12 to the operator, e.g., via the transporting mechanism 68 and/or conveyor devices 39, 45. The method may also include 106 opening a door associated with the location of the tray 12. As previously noted, the door may be manually or automatically opened via instructions from the control system 17 and an associated motor. The method may also include 108 illuminating a visual indicator 42 associated with the tray 12 that should be removed to indicate to the operator that the tray should be removed. The method may also include 110 loading the tray 12 which should be unloaded onto an unloading mechanism 40/transporting mechanism 68. As previously noted, this may include the use of one or more conveyor devices 39, 45 to move the tray 12 onto the unloading mechanism 40/transporting mechanism 68. The method may also include 112 activating the unloading mechanism 40/transporting mechanism 68 to deliver the tray 12 to the operator. The method may also include 114 moving the tray 12 from the unloading mechanism 40/transporting mechanism 68 to the trolley 46 or other transporting device. Again, this may include the use of conveying devices and/or a clamping mechanism 56. Once the tray 12 has been delivered by the operator, the vehicle 14 may depart to another destination and the process may be repeated.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in that particular order discussed or illustrated, unless specifically identified as an order of performance. It is also to be understood that additional or alternative steps may be employed and that features of different embodiments may be combined with one another.

When an element or layer is referred to as being "on," "engaged to," "connected to," or "coupled to" another element or layer, it may be directly on, engaged, connected or coupled to the other element or later, or intervening element or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to described various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A smart shelving system for storing and unloading parcels from a vehicle, comprising:
   a storage rack located in the vehicle and including a plurality of shelves stacked on top of one another in spaced relationship with one another and each having a side edge;
   a plurality of trays for holding the parcels positioned on the shelves;
   the side edge of at least one of the shelves being aligned with at least one opening of the vehicle; and
   at least one unloading mechanism including at least one platform configured to hold at least one of the trays and to be positioned on top of at least one of the shelves inside the vehicle, and wherein the platform of the unloading mechanism is configured to move the at least one of the trays from the location on top of the at least one of the shelves inside the vehicle, through the at least one opening to a location outside of the vehicle;
   wherein the at least one platform of the at least one unloading mechanism is configured to move vertically while located outside of the vehicle to permit the at least one tray on the at least one platform to move to a height which permits an operator to remove the at least one tray from the at least one platform of the at least one unloading mechanism.

2. The smart shelving system as set forth in claim 1, wherein the at least one unloading mechanism further includes at least one pivoting member pivotably connected to the at least one platform of the unloading mechanism and configured to provide the movement of the unloading mechanism out of the vehicle and configured to provide the vertical movement of the at least one platform of the at least one unloading mechanism.

3. The smart shelving system as set forth in claim 1 further including a conveying mechanism coupled to the at least one shelf and configured to load and unload the trays onto and off the at least one platform of the at least one unloading mechanism.

4. The smart shelving system as set forth in claim 1 further including a trolley configured to receive the trays from the unloading mechanism.

5. The smart shelving system as set forth in claim 4, wherein the trolley includes a support for holding the trays, and wherein the support is vertically moveable along the trolley.

6. The smart shelving system as set forth in claim 5, wherein the trolley further includes at least one clamping mechanism configured to removeably secure the trays to the trolley.

7. The smart shelving system as set forth in claim 6, wherein the at least one clamping mechanism of the trolley is configured to stack and secure a plurality of the trays on top of one another.

8. The smart shelving system as set forth in claim 1, wherein a plurality of visual indicators are located along the shelves, and wherein a control system is configured to activate the visual indicators to designate what trays are ready for removal and to designate what trays are not ready for removal.

9. The smart shelving system as set forth in claim 8, wherein the control system is configured to designate what trays are ready, and not ready for removal based on a detection of a location of the vehicle.

10. The smart shelving system as set forth in claim 8, wherein the visual indicators are a plurality of illumination elements configured to illuminate at different colors dependent on whether the trays are ready or not for removal.

11. The smart shelving system as set forth in claim 1, wherein the at least one unloading mechanism includes a plurality of unloading mechanisms, and wherein a control system is configured to activate each of the plurality of unloading mechanisms in response to a detection that the vehicle is located at predetermined locations.

12. The smart shelving system as set forth in claim 1, wherein the at least one opening of the vehicle includes a plurality of openings arranged side by side with one another along a length of the vehicle, and wherein each of the openings are selectively opened and closed by a plurality of doors.

13. The smart shelving system as set forth in claim 12, wherein a control system is configured to selectively open and close the plurality of doors based on a detected location of the vehicle such that predetermined trays among the trays are able to be removed from the vehicle through the plurality of openings.

14. The smart shelving system as set forth in claim 1, wherein the plurality of shelves are each configured to hold a plurality of the trays, wherein the plurality of shelves each include a conveying device that is configured to convey trays to the side edge after removal of another of the trays in order to permit the trays to be unloaded from the vehicle in a first in first out manner.

* * * * *